J. E. BOOMAN.
ACTUATING HOLDER FOR SMALL TOOLS.
APPLICATION FILED APR. 4, 1911.
1,016,607.
Patented Feb. 6, 1912.
2 SHEETS—SHEET 1.
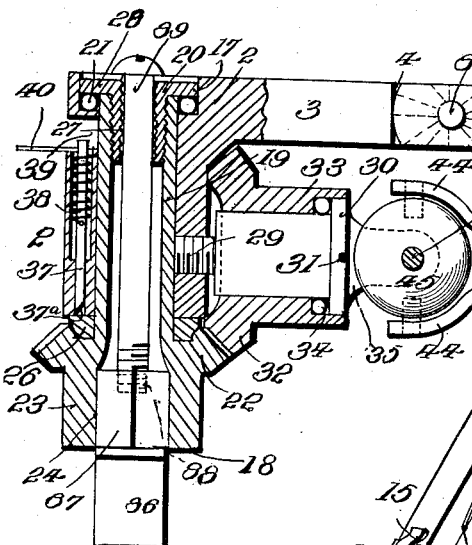
Inventor
J. E. Booman.
Witnesses
By
Attorneys.

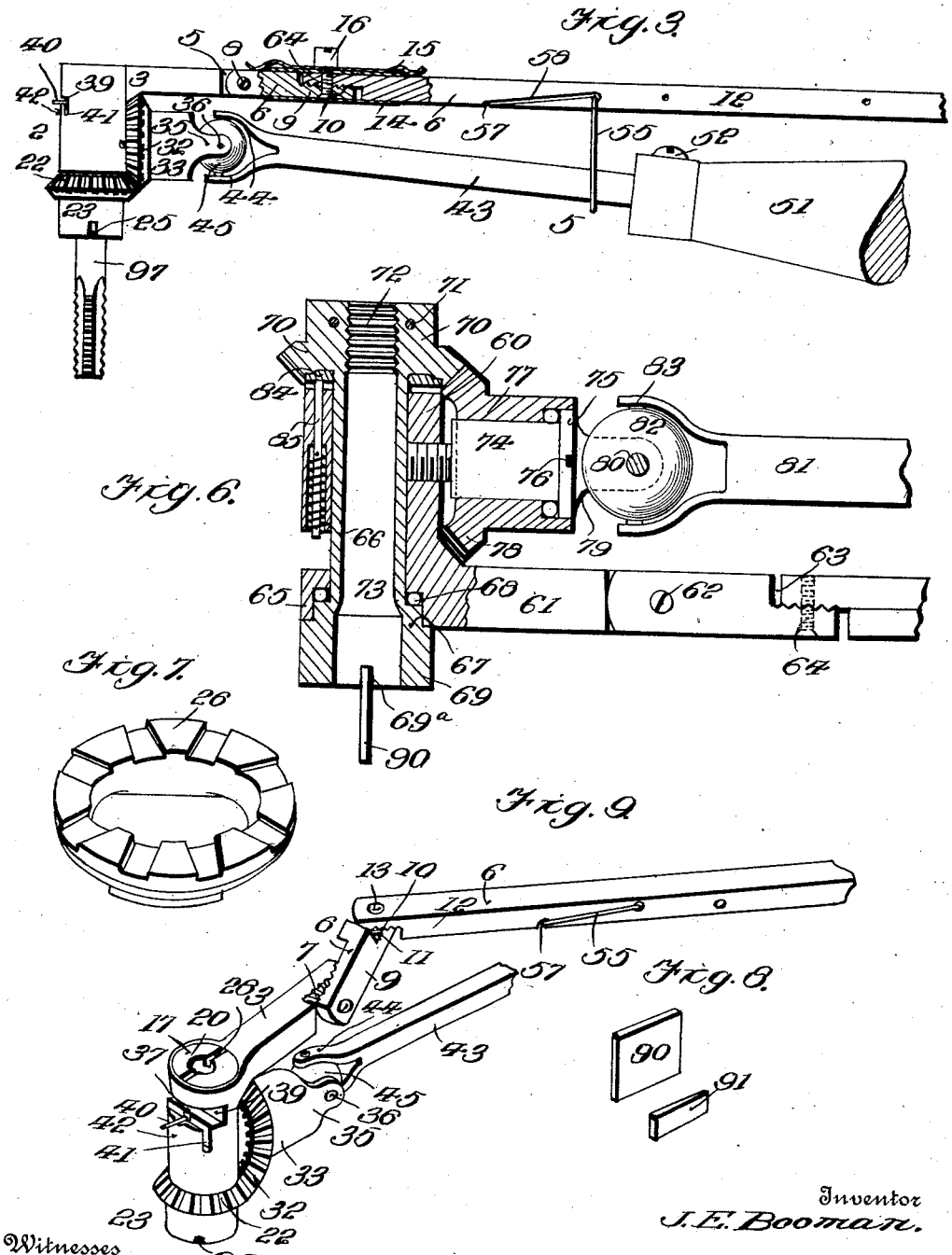

UNITED STATES PATENT OFFICE.

JOHAN E. BOOMAN, OF BROOKLYN, NEW YORK.

ACTUATING-HOLDER FOR SMALL TOOLS.

1,016,607. Specification of Letters Patent. Patented Feb. 6, 1912.

Application filed April 4, 1911. Serial No. 618,949.

*To all whom it may concern:*

Be it known that I, JOHAN E. BOOMAN, citizen of Sweden, residing at Brooklyn, in the county of Kings and State of New York, have invented certain new and useful Improvements in Actuating-Holders for Small Tools, of which the following is a specification.

My invention relates to tools for driving screws, drilling, reaming, removing or replacing nuts and for like operations, and the primary object of the invention is the provision of a tool of this character, particularly well adapted for use in situations wherein mechanism is so crowded together, as in automatic machinery for example, as to preclude the use of ordinary tools.

A further object is the provision of a device of this character having a handle whereby it may be supported, the handle being provided with a rotatable tool holder, and means independent of the handle whereby the tool carried in the tool holder may be driven either by hand or by power.

A still further object is the provision of a device of this character having a handle and a driving shaft independent of each other, and means whereby the driving shaft may be placed either at an angle to the handle or parallel thereto.

A still further object is to provide means whereby the tool holder at the end of the handle may be set in any desired angular relation with the handle.

A still further object is to provide means whereby the rotatable tool holder may be locked to the handle so that the handle and tool holder may be operated together, or whereby the tool holder may be intermittently rotated in one direction only, either by the handle itself or by the operating shaft.

A still further object is the provision of a tool of this character in which the handle and shaft are both provided with removable handles proper which are adapted to be shifted nearer to or farther from the head of the tool, or entirely removed if desired.

A further object is to provide for the substitution of a flexible shaft in place of the rigid shaft ordinarily used.

Other objects will appear in the course of the following description.

My invention is illustrated in the accompanying drawings wherein:

Figure 1 is a perspective view of my improved tool holder. Fig. 2 is an enlarged vertical sectional view of the holder, only portions of the handles being shown. Fig. 3 is a side elevation, partly sectional, of my tool holder when used as a ratchet wrench. Fig. 4 is a fragmentary elevation of a portion of the tool holder and one of the handles, a modified form of driving shaft being shown. Fig. 5 is a cross section on the line 5—5 of Fig. 3. Fig. 6 is a vertical section of the modified form of holder, the handle and driving shaft being shown in elevation. Fig. 7 is a perspective enlarged view of the ratchet plate. Fig. 8 is a perspective view of one form of screw-driver, the two members thereof being separated. Fig. 9 is a perspective view of the handle bar and a portion of the shank of the holder showing the manner in which the handle bar is turned to permit it to be inserted in places crowded with machinery.

Corresponding and like parts are referred to in the following description and indicated in all the views of the accompanying drawings by the same reference characters.

Referring particularly to Figs. 1 to 4, it will be seen that my improved tool includes a head 2, this head being tubular and having at one end the angularly projecting shank 3. This shank is reduced at 4, and the face of this reduced portion is formed with radial notches 5. A handle bar 6 is also reduced at its end so as to fit against the reduced portion 4 of the shank 3, and the face of the reduced portion of the handle bar is likewise provided with radial notches 7. A screw 8 passes through the shank and the end of the handle so as to hold them in any desired rotatably adjusted position.

The handle rod 6 is preferably made in two sections, one section 9 being relatively short. The section 9 is cut away at its end as at 10 and the face of this cutaway portion is provided with notches 11. The section 12 of the handle bar is likewise cut away at its end so as to overlap and fit upon the portion 10 of the section 9 and is likewise formed with coacting notches to engage with the notches 11. A screw 13 passes through the overlapping ends of the two sections of the handle bar and holds them in any desired rotatable position. It will be seen that the handle bar, therefore, may be extended in any desired angular relation to the head 2.

In order to assist in holding the handle bar in rigid engagement with the shaft 2, I may provide a sleeve 14 which fits snugly around the handle bar 6 and is shiftable therealong, and which may be slipped down over the joints connecting the two sections of the handle bar to each other and the handle bar to the shank. This sleeve is preferably provided with a spring 15 attached to its upper face by a screw 16, the ends of the spring projecting beyond the sleeve and being downwardly turned so as to have a frictional contact with the face of the handle bar 6.

The head 2, as before stated, is tubular. The upper end of the head is annularly recessed as at 17, while the tubular interior of the lower end of the head is enlarged. The lower face of the head is cut straight across at 18. Extending through the head is a tubular spindle 19 which at its upper end has screw threaded engagement with the tubular shank of a cap 20, this cap fitting the recess 17 formed on the upper end of the head and holding in place the antifriction balls 21.

Carried upon the lower end of the spindle 19 is the bevel gear wheel 22 which may be formed integral with the spindle or attached thereto. The spindle 19 extends down below the gear wheel so as to form a relatively enlarged head 23 having a square or many sided recess 24 formed in its center and opening on the bottom of the head, this recess being crossed by a notch 25 which extends diametrically across the head.

Resting upon the upper face of the gear wheel 22 is an annular ratchet plate 26, illustrated in Fig. 7, and formed with ratchet teeth. This ratchet plate is rotatable with the gear wheel 22.

The interior of the cap 20 is screw threaded as at 27, and the upper face of the cap 20 is transversely notched as at 28. Screw threaded into the side of the head 2 immediately beneath the shank 3 is a stub shaft 29, which at its end is formed with the enlarged head 30 having a transverse notch 31. Rotatable upon the stub shaft is the bevel gear wheel 32 which meshes with the gear wheel 22. This gear wheel 32 is formed integral with a tubular hub 33 which is recessed at its outer end to inclose the head 30. Antifriction balls 34 are placed between the inner face of the head 30 and the adjacent shoulder on the hub 33 so as to permit the sleeve to have a free rotary motion upon the stub shaft.

The hub 33 is so formed on opposite sides as to provide prolongations or arms 35 through which passes a removable pin 36 whereby a driving shaft may be connected to the hub 33 for the purpose of driving the bevel gear 33 and the bevel gear 22.

Disposed within the head 2 and extending parallel to the spindle 19 is a pawl 37. This pawl is surrounded by a spring 38 which acts to force the pawl downward. The face of the head 2 is transversely cut away as at 39 and the pawl extends upward into this cutaway portion and at its upper end is provided with the outwardly projecting pin 40. By raising this pin, the pawl may be raised and when the pin is released, the spring 38 will force the pawl downward and into engagement with the ratchet teeth 26. The pawl at its lower end is beveled on one face as at 37$^a$ (see Fig. 2) and this beveled extremity is adapted to engage with the ratchet plate 26. It will be seen that when the inclined face 37 is turned in one direction, the pawl will permit the rotation of the gear and spindle in one direction but will prevent its rotation in the other, and that when the pawl is turned half-way around it will act reversely to its action in the first instance.

In order to provide for a rotation of the pawl 37 through a half circle and for holding the pawl in this position, and to also provide for raising the pawl out of engagement with the ratchet teeth, I form a transversely extending recess or slit 41 which intersects the pawl 37 and extends at a tangent to the face of the head 2. This recess is sufficiently deep so that when the pin 40 is turned into alinement with the recess, the pawl will be forced downward into engagement with the teeth 26, but that when the pin 40 is engaged with the wall 42 between the ends of the recess 41, the pawl will be held upward in its raised position and out of engagement with the ratchet teeth.

When it is desired that the spindle 19 and the gear wheel 22 shall rotate freely in either direction, then the pawl is raised and the lug 40 is engaged in a notch formed in the middle of the wall 42. When it is desired that the spindle 19 and gear wheel 22 shall rotate only in one direction and be held from any backward movement, then the pawl is shifted in one direction or the other until the lug is in alinement with the slot 39, whereupon the spring will draw the pawl downward into engagement with the teeth 26 as before explained.

For the purpose of driving the sleeve 33 and the bevel gear 32, I provide a shaft which is either flexible or has a universal joint connection with the sleeve 33. As shown in Fig. 1, the shaft 43 at its end is bifurcated to provide the divergent arms 44, between which is pivotally mounted the ball 45. The pin 36 previously described is passed through this ball and links the ball 45 to the arms 35. It will be seen that this is an ordinary universal joint and that this connection permits the rotation of the shaft 43 to be transmitted to the sleeve 33, even when the shaft is at an angle to the axis of the sleeve. In place of the rigid shaft 43 with the ball 45, I may provide a flexible shaft such as illustrated in Fig. 4, illustrated as comprising a length of coiled wire designated 47 having at its end a somewhat enlarged head 48, this head having a transverse passage 49 for the reception of the pin 36. This length of flexible shaft 47 may be connected either to a source of power, or may be provided with a detachable handle 50.

Where the solid shaft 43 is used, it is intended to be provided with the detachable handle 51 which is fastened in place by a set screw 52 and which has a square passage extending entirely through it so that the handle may be slipped along to any desired position upon the shaft 43. The handle bar 6 is also provided with a detachable handle 53 which is held in place by a set screw 54 and may be slipped along the bar 6 to any desired position or entirely removed from the bar.

The tools which may be used with the implement above described and the manner of using them will be described later. The operation of the implement so far as described will be obvious from what has gone before. The handle bar 6 may be either held by the operator or supported by any suitable clamping means. Under ordinary circumstances, it will be held by the operator. Where the device is intended to be used in the manner of a ratchet wrench, the shaft 43 is preferably moved up into a parallel position with the handle bar 6 and supported in this position by a spring link 55. This link is open at its lower end and has the return bends 56, permitting the shaft 43 to be easily inserted into or withdrawn from the link. When the link is not in use, it is intended to be turned up against the handle bar 6 and is held in this position by engagement with a notch 57 and with opposed longitudinal inclined grooves 58 cut in the handle bar 6. When the shaft 43 is turned up in the position shown in Fig. 3, as for instance where the tool is to be used in the manner of a ratchet wrench, the shaft 43 will be oscillated with the handle bar 6. The bevel gear wheel 22 will be prevented from rotating upon a movement of the handle bar in one direction but will rotate upon a movement of the handle bar in the other direction, by reason of the engagement of the pawl 37 with the ratchet teeth 26. Upon a reverse movement of the handle bar, it will be obvious that the gear wheel 32 will rotate, while upon an actuating movement of the handle bar, the gear wheel 32 will remain fixed and simply move with the gear wheel 22. It will also be obvious that with the pawl 37 forced into engagement with the teeth 26, the gear wheel 22 and the tool holder or carrier may be rotated intermittently in one direction by means of the shaft 43, which in this case may be actuated by hand. The direction in which the tool carried in the tool carrier and actuated by the gear wheel 22 may be rotated, depends of course upon the position of the pawl 37 with relation to the teeth 26, as before explained. It will be obvious that inasmuch as the shaft 43 has a swivel or universal connection with the sleeve 33 carrying the gear 32, the shaft may be held in various angular relations to the handle bar 6 and to the work being operated on.

If the pawl 37 is entirely raised from its engagement with the ratchet teeth 26, then the tool may be rotated continuously in one direction or may be oscillated by giving either a continuous rotation to the shaft 43 or an oscillatory movement thereto. A continuous rotation may be given to the shaft 43 either by the hand or by connecting it to any suitable source of power, as by a flexible shaft leading to a motor. An oscillatory movement may be communicated to the shaft 43 by hand, thus permitting an oscillation to be given to the tool. By removing the handles 53 and 51, the handle bar and the shaft may be connected to any suitable supporting or driving mechanism. The handle bar 6 being jointed, may be shifted in any desired angular relation to the head, thus permitting the implement to be used in situations where mechanism is very closely crowded together, and where it would be impossible to use an absolutely straight tool and yet secure a firm support for the head 2.

The sleeve 14 when forced over the joints at 13 and 8, prevents these joints from breaking and holds the handle bar in a perfectly rigid position. It will be seen that my construction also permits the substitution of a flexible shaft 47 for the rigid shaft 43 whenever desired, as in many circumstances it will be impossible to use the straight shaft 43 and a flexible shaft will have to be substituted therefor.

In Fig. 6 I show a slightly different form of construction wherein the handle bar is disposed at the lower end of the head immediately adjacent to the tool. This construction operates on precisely the same principle as the construction first described. In this form of my invention 60 designates the head which is tubular as before described and is provided with the angular arm 61 or shank corresponding to the shank 3. This is jointed at 62 to the handle rod 63, the handle rod being formed in sections, one section being jointed to the other by means of the pivot pin 64 or as previously described.

The lower end of the tubular head 60 is recessed at 65, and passing through the tubular head is the tubular spindle 66 which, at its lower end, is enlarged as at 67 to fit the recess 65. Ball bearings 68 are placed between the walls of the recess 65 and the adjacent face of the enlarged portion 67. The lower end of the tubular head is preferably square or many sided for the reception of various tools and is enlarged as at 69 so as to bear against the under face of the tubular head 60.

The spindle 66 extends upward above the upper end of the head 60, and fitting over the upper end of the tubular spindle is the bevel gear wheel 70, the hub of which is pinned to the upper end of the spindle 66 by means of the oppositely disposed transversely extending pins 71. The interior of the spindle for a portion of its length is screw threaded as at 72 and the lower portion of the spindle is slightly flared from the point 73 to permit the easy insertion of a tool having a tapering shank.

Projecting from the face of the tubular head 60 is the stub shaft 74 which has screw threaded engagement with the head and is formed with the enlarged end 75, transversely notched as at 76 to permit the easy removal of the stub shaft. Fitting over this stub shaft is a sleeve 77 which is formed integral with or carries a bevel gear 78. It will be seen that the enlarged end 75 of the stub shaft holds the bevel gear and sleeve in place, and the bevel gear in meshing engagement with the gear wheel 70. The sleeve 77 is cut away to provide two oppositely disposed projecting ears 79, through which passes the removable pin 80. The driving shaft 81 is of precisely the same form as the driving shaft 43 previously described, the shaft 81 being bifurcated at its end and having a universal joint connection with the sleeve 75 by means of the ball 82 and a transverse pin 83.

A flexible shaft, such as the shaft 47 previously described may be substituted for the rigid shaft 81, if desired. The end face of the gear wheel 70 carries a ratchet plate 84 corresponding to the ratchet plate 26 previously described, and a spring actuated pawl 85 of precisely the same form and operation as the pawl previously described, engages with the ratchet plate 84. When the pawl is turned in one direction, it will prevent the gear wheel 70 from revolving in one direction, but will permit its rotation in the opposite direction, while a reverse movement of the pawl will permit a reverse movement of the gear wheel 70. Where the pawl is placed in its middle position and depressed entirely out of engagement with the ratchet plate 84, the bevel gear wheel 70 may be revolved in either direction, or given an oscillatory movement.

My implement is adapted to be used with a large variety of tools, some of which I have illustrated in the figures. In Fig. 2 I show a screw-driver as inserted in the tool holder. This screw-driver consists of a blade 86 forming part of a many sided shank 87, this shank being tubular and screw threaded as at 88 for engagement with a screw 89 which extends down through the tubular shank 19. This screw engages the screw threads 88, thus holding the screw-driver in place within the tool holder. When it is desired to remove the screw-driver, it is only necessary to remove the screw 89, whereupon the screw-driver may be easily forced out.

It will be noted that the head 69 in the construction shown in Fig. 6 is formed with a transverse notch or slot 69$^a$. This notch is for the purpose of holding a screw-driver such as shown in Fig. 8, consisting simply of a small plate of steel 90 which is wedged in place in the notch by means of a wedge 91. Other tools, of course, may be held in this notch in the same manner. One of the tools which may be used in connection with this implement is the drill 93 as shown in Fig. 1, which has the shaft of the usual drill and whose tapered shank is adapted to be inserted in the chuck opening 24 and extend up into the tubular spindle. In connection with the drill I may use the feed screw 94, as illustrated in Fig. 1, this feed screw having a screw threaded shank which is inserted in the upper end of the tubular spindle and being provided with the pointed head 95. This head is provided with a plurality of radiating perforations 96 whereby an instrument may be inserted for rotating the feed screw from time to time.

In Fig. 3 I show a tap which is adapted to be used with my holder. This tap 97 is of the usual form and adapted to be inserted in the chuck opening 24.

While I have described a number of tools which may be used with my improved implement, it will be obvious that other tools might be so used, and that the tool is adapted for a large number of uses and may be used for reaming, countersinking, milling, screw-driving, removing or replacing nuts and used as a ratchet wrench or ratchet drill, if desired.

My invention is simple and is particularly convenient, as before stated, where it is desired to work upon automatic machinery, or machinery wherein the parts are very much crowded together.

The tool is of great convenience for use on an automobile where it is obvious that a flexible shaft may be attached to any of the driving shafts of the automobile and the other end of the flexible shaft connected to the driving gear 32 or the driving gear 78 in the manner previously described. With the tool thus arranged, the workman can go all over the automobile and drill with it, remove nuts, countersink or do any other work of this character.

The tool may be also used on a milling machine. In this case, the handle bar is clamped on the top of the machine and the driving shaft is placed in the chuck of the machine. This permits it to be used as a vertical milling attachment, or for drilling a hole inside of a recess. It is also possible to drive the driving shaft by placing over the handle 51 a rubber ring and placing the handle in contact with a revolving pulley.

I have found this tool particularly effective in practical use and capable of a large number of practical applications.

What I claim is:

1. An implement including a tool holding head, an arm projecting from the head, a sectional handle, one of the sections being pivoted to said arm, the other section being pivoted to the first named section for movement in a plane at right angles to the plane of movement of the first named section, and means for holding the sections of the handle in their adjusted position.

2. An implement of the character described including a rotatable tool holder, a head in which the tool holder is mounted, means for rotating the holder, and a sectional handle bar having an angularly adjustable connection to the head, the sections of the handle bar being angularly adjustable relative to each other, and means for holding the sections of the handle bar in any adjusted position.

3. An implement of the character described including a tool supporting head having an arm projecting radially therefrom, the arm being cut away on one face, a handle bar made in two sections, one of said sections being cut away and fitting against the cutaway portion of the arm and being pivoted thereto, the opposite end of said section being cut away, the second named section of the handle bar being cut away at one end to fit against the cutaway portion of the first named section and being pivoted thereto, and a longitudinally movable sleeve mounted on the handle bar and movable over the coacting ends of the two sections to hold the sections in alinement with each other.

4. An implement of the character described including a tubular head, a tubular tool holder rotatably mounted in said head, a handle bar extending radially from the head and formed with sections angularly adjustable with relation to each other and to the head, a driving shaft, means for rotating the tool holder, and flexible means connecting the driving shaft to the means for rotating the tool holder.

5. An implement of the character described including a tubular head, a rotatable tool holder mounted in the head, gearing mounted on the head for rotating the tool holder relatively to the head, a handle bar extending radially from the head, a driving shaft flexibly connected to the gearing for rotating the tool holder, and shiftable means for locking the holder from rotation independent of the head when in one position but shiftable to permit the holder to rotate independently of the head under the impulse of the driving shaft.

6. An implement of the character described including a tubular head, a rotatable tool holder mounted in the head, gearing mounted on the head for rotating the tool holder relatively to the head, a handle bar extending radially from the head, a driving shaft flexibly connected to the gearing for rotating the tool holder, shiftable means for locking the holder from rotation independent of the head when in one position but shiftable to permit the holder to rotate independently of the head under the impulse of the driving shaft, and means for supporting the driving shaft in a position approximately parallel to the handle bar.

7. An implement of the character described including a tubular head, a tool holder rotatably mounted in the head, gearing mounted on the head for rotating the tool holder, a handle bar extending radially from the head, a shaft flexibly connected to said gearing, said shaft having a portion thereof many-sided in cross section, and a handle mounted upon the shaft, said handle being removable therefrom to permit the shaft to be engaged with driving mechanism.

8. An implement of the character described including a tubular cylindrical head having a handle bar extending radially therefrom at one end, a rotatable tool holder mounted in the head and having a bevel gear wheel at one end, a stub shaft mounted on the head at right angles to the axis of the tool holder, a bevel gear thereon meshing with the bevel gear on the tool holder, a driving shaft, and a flexible connection between the driving shaft and the bevel gear on the head.

9. An implement of the character described including a cylindrical tubular head having an arm extending radially therefrom, a sectional handle bar pivoted to said arm, the sections of the handle bar being angularly adjustable relatively to each other and to the head, a tool holder rotatably mounted in the head, a bevel gear wheel on one end of the holder, a bevel gear wheel mounted upon the head with its axis at right angles to the tool holder and engaging the bevel gear on the holder, and a shaft flexibly connected to the gear wheel on the head.

10. In an implement of the character described, a supporting member having a handle, a tool holding member concentric to and rotatable upon the supporting member, one of said members having a longitudinally extending passage terminating in a transverse slot, a ratchet fast on the other member, and a longitudinally shiftable rotatable pin carried in said passage and having a beveled terminal end engageable with the teeth of said ratchet, and an angularly projecting pin on the other end of the locking pin and normally disposed in said slot.

11. In an implement of the character described, a tubular cylindrical head having a handle projecting radially therefrom, a tubular tool holding member rotatable within said head, a ratchet member fast on said tool holder, the face of said member being formed with ratchet teeth, the head being formed with a longitudinally extending passage terminating at one end in a transverse slot, a longitudinally movable, rotatable locking pin carried in the passage and having a beveled terminal end engageable with the toothed face of the ratchet, an angularly extending pin at the other end of the locking pin projecting out through said slot whereby the pin may be turned, and a spring acting to hold the locking pin in engagement with the teeth on the ratchet.

12. An implement of the character described, including a tubular head having a handle extending radially therefrom, a tool holder rotatably mounted in the head and having a gear wheel connected thereto, a reversible pawl resiliently engageable with the holder to prevent its rotation in one or the other direction, a driving gear wheel mounted upon the holder and engaging the gear wheel on the holder, a driving shaft attached to the driving gear wheel, and means on the handle for supporting the shaft in a position parallel to the handle, said means permitting the shaft to be moved out of said parallel position.

13. An implement of the character described including a tubular head having a radially extending shank, a sectional handle pivotally connected to the shank and adapted for adjustment in various angular directions, a tubular spindle forming a tool holder and extending through the head, the spindle being internally screw threaded at one end, a gear wheel on the spindle, a driving gear wheel mounted upon the head and engaging the first named gear wheel, a shaft flexibly connected to said driving gear wheel, and a cap having screw threaded engagement with the tool holder.

14. An implement of the character described including a head, a tool holder rotatably mounted in the head, a handle bar extending radially from the head, and a driving shaft extending radially from the head and operatively connected to the rotatable tool holder, said handle bar and driving shaft being angularly adjustable with relation to each other.

15. An implement of the character described, including a head, a rotatable tool holder mounted in said head, a handle bar projecting from the head, and a driving shaft independent of the handle bar and operatively connected to the rotatable tool holder for actuating the same, said driving shaft and handle being angularly adjustable relative to each other.

In testimony whereof, I affix my signature in presence of two witnesses.

JOHAN E. BOOMAN. [L. S.]

Witnesses:
  Jos. F. LONGWORTH,
  BERNARD WAGNER.

---

Copies of this patent may be obtained for five cents each, by addressing the "Commissioner of Patents, Washington, D. C."